US006382471B2

(12) United States Patent
Bonningue et al.

(10) Patent No.: US 6,382,471 B2
(45) Date of Patent: May 7, 2002

(54) PUMP INCLUDING A MOVING MEMBER PROVIDED WITH A CENTRAL DUCT AND A DIAPHRAGM HAVING ENGAGEMENT MEANS BEARING AGAINST SAID CENTRAL DUCT, AND A RECEPTACLE FITTED THEREWITH

(75) Inventors: Philippe Bonningue, Paris; Gilles Baudin, Domont, both of (FR)

(73) Assignee: L'Oreal, Paris (FR)

( * ) Notice: Subject to any disclaimer, the term of this patent is extended or adjusted under 35 U.S.C. 154(b) by 0 days.

(21) Appl. No.: 09/768,251

(22) Filed: Jan. 25, 2001

(30) Foreign Application Priority Data

Feb. 15, 2000 (FR) .......................................... 00 01843

(51) Int. Cl.[7] ............................................. G01F 11/06
(52) U.S. Cl. ................................................ 222/321.9
(58) Field of Search ......................... 222/321.7, 321.9, 222/385, 321.2

(56) References Cited

U.S. PATENT DOCUMENTS 5,704,519 A * 1/1998 Crosnier et al. ......... 222/321.9

* cited by examiner

*Primary Examiner*—Philippe Derakshani
(74) *Attorney, Agent, or Firm*—Oliff & Berridge, PLC

(57) ABSTRACT

A pump of the type comprising a moving member mounted to move relative to a support, the moving member having a central duct in which the substance to be dispensed penetrates via at least one opening, the support co-operating with the moving member to define a variable-volume pump chamber around said central duct, the pump having a diaphragm held by retaining means on the support, the diaphragm having a central portion in which one end of said central duct is inserted, the diaphragm having a valve-forming portion arranged to isolate the pump chamber from said opening(s) of the central duct while the volume of the pump chamber is increasing and the substance is being sucked into the pump chamber, the diaphragm also bearing against the moving member in such a manner that movement of the moving member to dispense the substance causes the diaphragm to be stretched elastically. The pump has means suitable, during movement of the moving member for dispensing the substance, for minimizing the stretching of the valve-forming portion of said diaphragm.

49 Claims, 7 Drawing Sheets

PUMP INCLUDING A MOVING MEMBER PROVIDED WITH A CENTRAL DUCT AND A DIAPHRAGM HAVING ENGAGEMENT MEANS BEARING AGAINST SAID CENTRAL DUCT, AND A RECEPTACLE FITTED THEREWITH

The present invention relates to a pump and to a receptacle containing a liquid, e.g. a cosmetic or care cream, and fitted with such a pump.

BACKGROUND OF THE INVENTION

French patent FR-B-2 728 809 discloses a pump having a pushbutton movably mounted on a support secured to the receptacle containing the substance to be dispensed, the pushbutton having a central duct provided with a radial opening at its bottom end, the support defining a variable-volume pump chamber around said central duct. A diaphragm made of elastomer material is mounted on the support. The diaphragm has a central portion in the form of a sleeve that is open at its top end and closed at its bottom end. The central duct of the pushbutton is inserted in the diaphragm via one end until it bears against the end wall of the central portion of the diaphragm.

The above diaphragm acts as a spring for returning the pushbutton to its initial position after dispensing a quantity of substance.

It also acts as a delivery valve.

During the return movement of the pushbutton, the diaphragm presses against the central duct and isolates the pump chamber from the radial opening in the central duct so as to prevent air returning into the pump chamber.

Such a pump has the advantage of requiring only a small number of parts and thus of being suitable for manufacture at relatively low cost.

Nevertheless, that known pump does not provide full satisfaction.

In particular, the pump can be difficult to prime and under certain conditions the substance flows with difficulty between the central duct of the pushbutton and the diaphragm, thereby causing the pushbutton to jam.

OBJECTS AND SUMMARY OF THE INVENTION

The invention seeks to further improve a pump of the type comprising a moving member mounted to move relative to a support, the moving member having a central duct in which the substance to be dispensed penetrates via at least one opening, the support co-operating with the moving member to define a variable-volume pump chamber around said central duct, the pump having a diaphragm held by retaining means on the support, the diaphragm having a central portion in which one end of said central duct is inserted, the diaphragm having a valve-forming portion arranged to isolate the pump chamber from said opening(s) of the central duct while the volume of the pump chamber is increasing and the substance is being sucked into the pump chamber, the diaphragm also bearing against the moving member in such a manner that movement of the moving member to dispense the substance causes the diaphragm to be stretched elastically.

The new pump of the invention has means suitable, during movement of the moving member for dispensing the substance, for minimizing the stretching of the valve-forming portion of said diaphragm. In a preferred embodiment, the central portion of the diaphragm has first engagement means arranged to co-operate with second engagement means secured to the central duct, the second engagement means being spaced apart from the end of the duct which is inserted in the central portion of the diaphragm.

By the invention, the end of the central duct bears only lightly or not at all against the end wall of the central portion of the diaphragm when the moving member is moved to dispense the substance, unlike the pump described in French patent 2 728 809 in which the diaphragm is stretched elastically, specifically by the fact that the central duct of the pushbutton bears directly against the end wall of the sleeve-shaped central portion of the diaphragm.

Advantageously, the portion of the diaphragm extending between the retaining means of the support and the engagement zone of the central duct performs a spring function only.

Also advantageously, the portion of the valve-forming diaphragm that is arranged to isolate the pump chamber from the opening(s) of the central duct lies outside the portion of the diaphragm that extends between the zone for fixing on the support and the zone for engagement on the central duct.

In the invention, the central portion of the diaphragm comes to bear against the central duct at a location that is remote from the end thereof, thereby reducing the mechanical stresses to which the end wall of the central portion of the diaphragm is subjected.

In addition, because the end wall of the central portion of the diaphragm is subjected to less stress, it becomes easier to enable the diaphragm to perform its delivery valve function, i.e. to enable it to isolate the pump chamber from the opening(s) of the central duct while the volume of the pump chamber is increasing and substance is being sucked into the chamber. The bottom portion of the central portion of the diaphragm can deform more easily in a direction perpendicular to the direction in which the top portion of the central portion of the diaphragm is stretched because it is subjected to less axial stress, and this makes it easier to pass the substance that is to be dispensed.

In a particular embodiment, the first engagement means of the diaphragm form a channel that is open in the direction facing away from the end wall of the central portion of the diaphragm, and the second engagement means comprise an engagement skirt directed towards the end of the central duct.

Still in a particular embodiment, the above-mentioned channel is formed between two concentric tubular walls respectively constituting the bottom portion and the top portion of the central portion of the diaphragm, that overlap in part, and that are united by a transverse wall constituting the web of said channel.

Advantageously, the tubular wall forming the bottom portion of the central portion of the diaphragm has at least one and preferably a plurality of axial slots in its radially inner surface.

These axial channels facilitate flow of the substance while it is being dispensed.

Advantageously, the above-mentioned axial slots extend downwards from the top end of the tubular wall forming the bottom portion of the central portion of the diaphragm to perceptibly beneath the above-mentioned transverse wall.

Advantageously, the diaphragm is arranged to isolate the pump chamber from the opening(s) of the central duct by causing an annular region to bear in leakproof manner against a zone of the central duct situated beneath the second engagement means.

This zone of the central duct against which the diaphragm presses while the volume of the pump chamber is increasing and the substance is being sucked into the chamber is advantageously defined by an annular bead. The diaphragm co-operates with the central duct to provide annular clearance on either side of said bead, thereby making it easier for the substance to flow while it is being dispensed.

In a particular embodiment, the bottom portion of the central duct has at least one radial opening.

In a variant, the bottom portion of the central duct does not have any radial opening, which makes it easier to manufacture.

Advantageously, the second engagement means of the central duct are constituted by the ends of thicker portions of the central duct, said thicker portions leaving slots between one another enabling the substance to pass towards the opening(s) of the central duct.

Advantageously, the diaphragm has a flexible lip suitable firstly for isolating the pump chamber from the source of substance while the volume of the pump chamber is decreasing, and secondly for enabling the substance to penetrate into the pump chamber while the volume thereof is increasing.

This flexible lip acts somewhat like an intake valve.

Furthermore, the flexible lip is advantageously connected to the central portion of the diaphragm so as to form a downwardly open annular channel, and the retaining means are constituted by the end of an inner skirt coming to bear against the web of said channel so as to retain the diaphragm when the moving member is moved downwards in order to decrease the volume of the pump chamber.

The above-mentioned inner skirt advantageously has openings at its top end, the height of the openings being less than the height of the flexible lip, said openings enabling the substance to reach the pump chamber while its volume is increasing, and while the flexible lip is spaced apart from the inner skirt under the effect of thrust from the substance flowing towards the pump chamber.

In a particular embodiment, the flexible lip is of thickness that increases going towards the top end of the diaphragm.

Still in a particular embodiment, the central portion of the diaphragm is connected at its top end to an annular portion of width and thickness selected in such a manner as to improve retention of the diaphragm while said central portion is being stretched.

Advantageously, the support includes sealing means bearing in leakproof manner against the tubular skirt of the moving member, said tubular skirt being downwardly open and extending concentrically around the central duct, said tubular skirt also defining the radially outer wall of the pump chamber.

Advantageously, when the pump is at rest, the portion of the diaphragm that extends axially between the retaining means and the engagement means of the duct is under tension, which enables the moving member to be maintained in abutment in its high position.

The invention also provides a receptacle fitted with a pump as defined above.

BRIEF DESCRIPTION OF THE DRAWINGS

Other characteristics and advantages of the present invention will appear on reading the following detailed is description of non-limiting embodiments and on examining the accompanying drawings, in which.

MORE DETAILED DESCRIPTION

Figure 1:
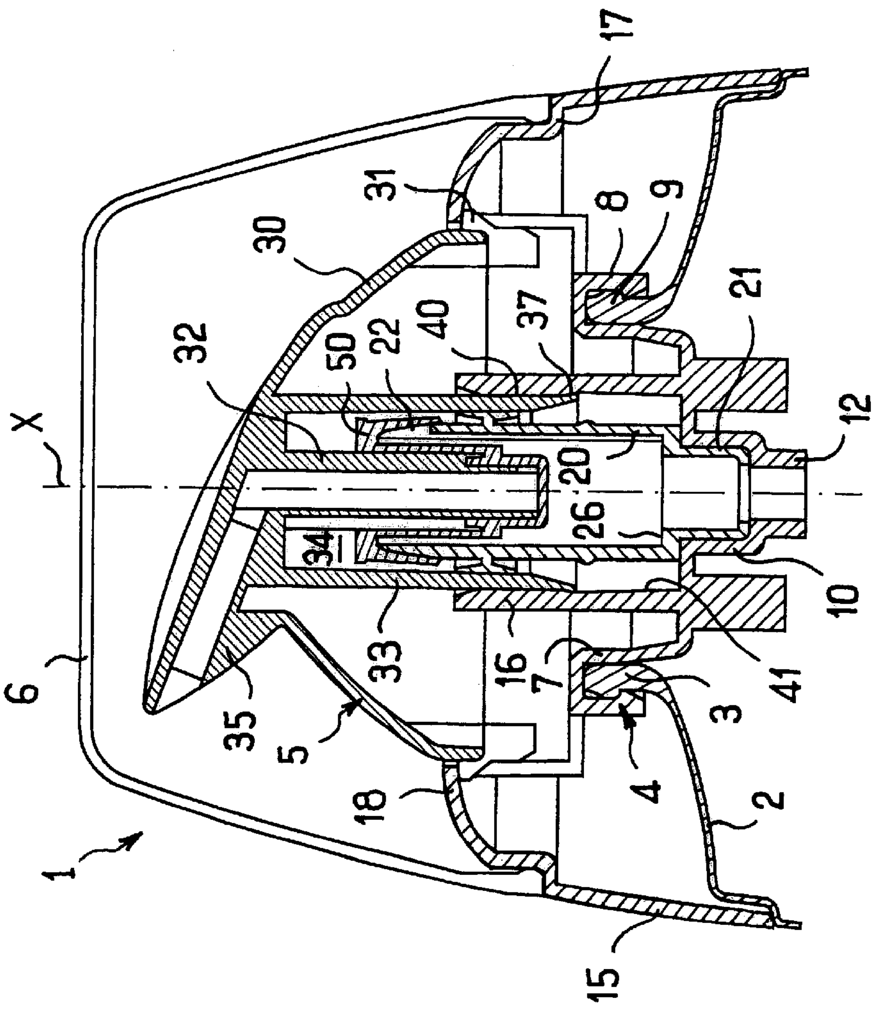
FIG. 1 is a fragmentary diagrammatic axial section view of a receptacle fitted with a pump constituting a first embodiment of the invention.

FIG. 1 shows a receptacle 1 having a tank-forming body 2, and the drawing shows only the top end thereof which defines a neck 3 onto which a support 4 is snap-fastened.

The support 4 constitutes a guide for mounting a pushbutton 5 to slide along an axis X, and it also serves to mount a removable closure cap 6 that covers the pushbutton 5 before first use thereof.

In the embodiment described, the support 4 has a sealing skirt 7 bearing in leakproof manner against the inside surface of the neck 3.

The sealing skirt 7 is extended radially firstly outwards by fixing tabs 8 that are snap-fastened on an annular rim 9 of the neck 3, and secondly inwards by a stepped wall 10 defining an endpiece 12 for connection to a dip tube (not shown).

An outer skirt 15 and a guide skirt 16 are made as a one-piece molding of plastics material together with the sealing skirt 7, the fixing tabs 8, and the stepped wall 10.

The outer skirt 15 extends around the neck 3 of the receptacle and has a shoulder 17 against which the closure cap 6 bears.

The top edge 18 of the outer skirt 15 retains the pushbutton 5 at rest, as described below.

The support 4 has an inner skirt 20 constituted by an insert whose bottom end 21 is engaged by force in the stepped wall 10.

Figure 3:
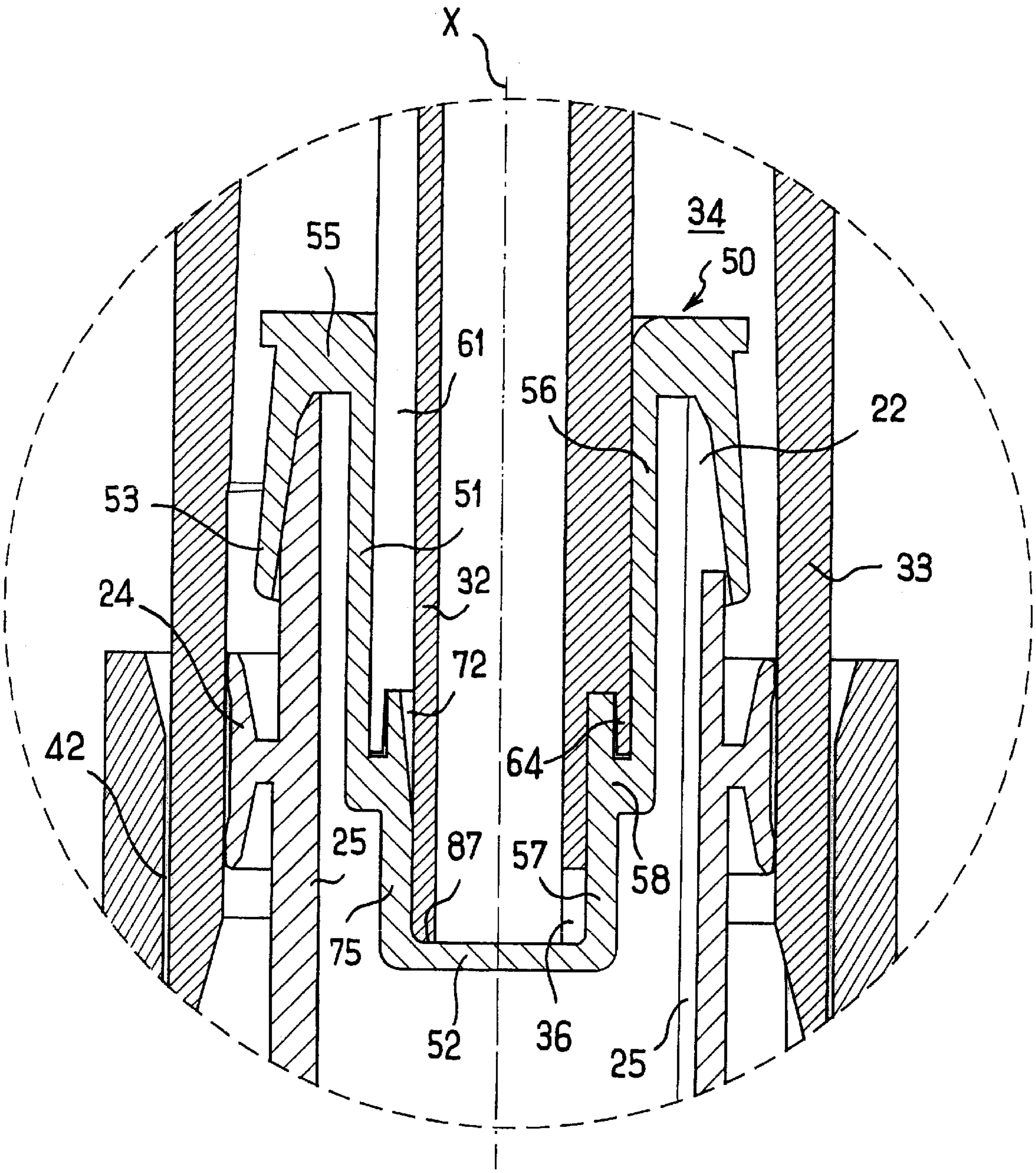
FIG. 3 shows a detail of FIG. 1.
Figure 4:
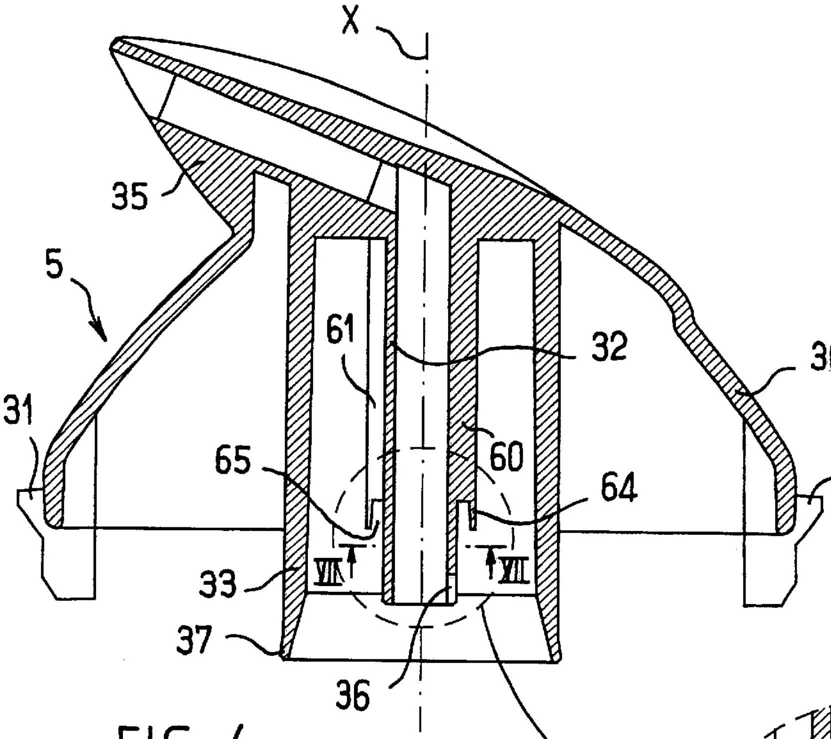
FIG. 4 shows the pushbutton in isolation.

The inner skirt 20 has a perceptibly tapering top end provided with radial openings 22 as can be seen more particularly in FIG. 3.

These openings 22 in the example described are in the form of slots running parallel to the axis X, and extended downwards by grooves 25 extending along the radially inner surface of the inner skirt 20 as far as a step 26.

A pair of annular sealing lips 24 are made integrally with the inner skirt 20 on the outside thereof by molding a plastics material.

The pushbutton 5 has an outer skirt 30 provided at its bottom end with catches 31 that come into abutment against the top edge 18 of the outer skirt 15 of the support 4 when the pushbutton 5 is at rest in its high position, as shown in FIG. 1.

The pushbutton 5 also has a central duct 32 on the axis X and a concentric tubular skirt 33 defining an annular pump chamber 34 around the central duct 32.

The outer skirt 30, the tubular skirt 33, and the central duct 32 are made integrally by molding a plastics material together with a dispensing endpiece 35 that communicates internally with the central duct 32.

Figure 2:
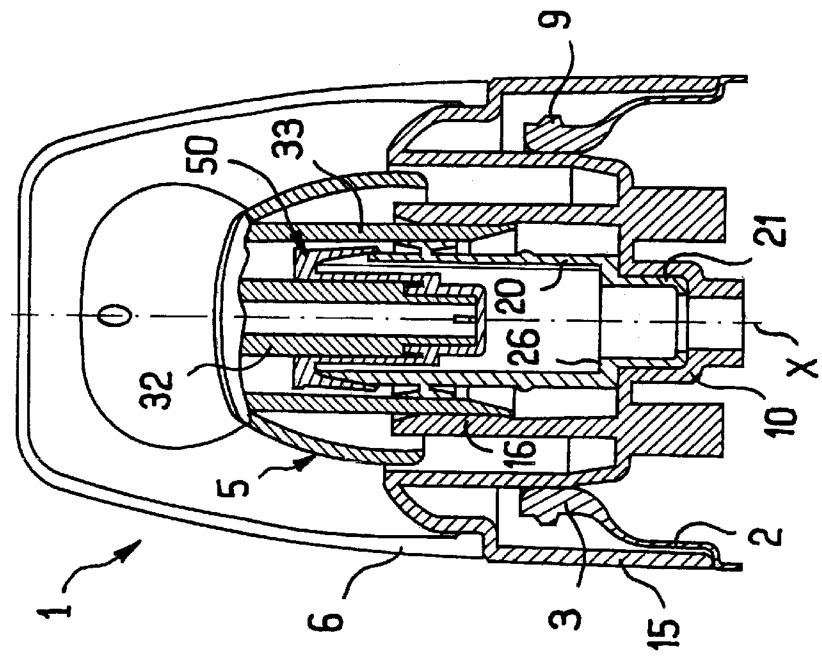
FIG. 2 is an axial section view in a plane perpendicular to that of FIG. 1.

In the embodiment shown in FIGS. 1 to 3, the bottom end 87 of the central duct 32 has radial openings 36.

The bottom end of the tubular skirt 33 forms a sealing lip 37 extending radially outwards a little.

The guide skirt 16 of the support 4 has a circularly cylindrical inside surface 40 in its top portion and a shallow annular setback 41 in its bottom portion.

When the pushbutton 5 is in the high position, the sealing lip 37 bears in leakproof manner against the inside surface 40 of the top portion of the guide skirt 16, as shown in FIG. 1.

The inside of the receptacle is thus isolated from the surrounding air, which favors good conservation of the substance.

When the pushbutton 5 is pressed down, the sealing lip 37 ceases to bear in leakproof manner against the guide skirt 16 because of the annular setback 41, thereby enabling the annular channel formed between the inner skirt 20 and the guide skirt 16 to communicate with the outside via the annular clearance 42 shown in FIG. 3.

Figure 6:
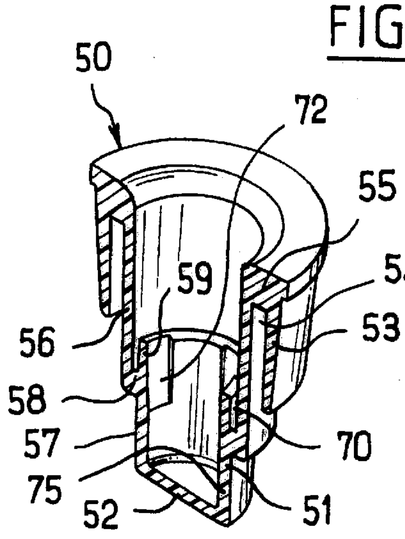
FIG. 6 is a perspective view in axial section showing the diaphragm in isolation.
Figure 9:
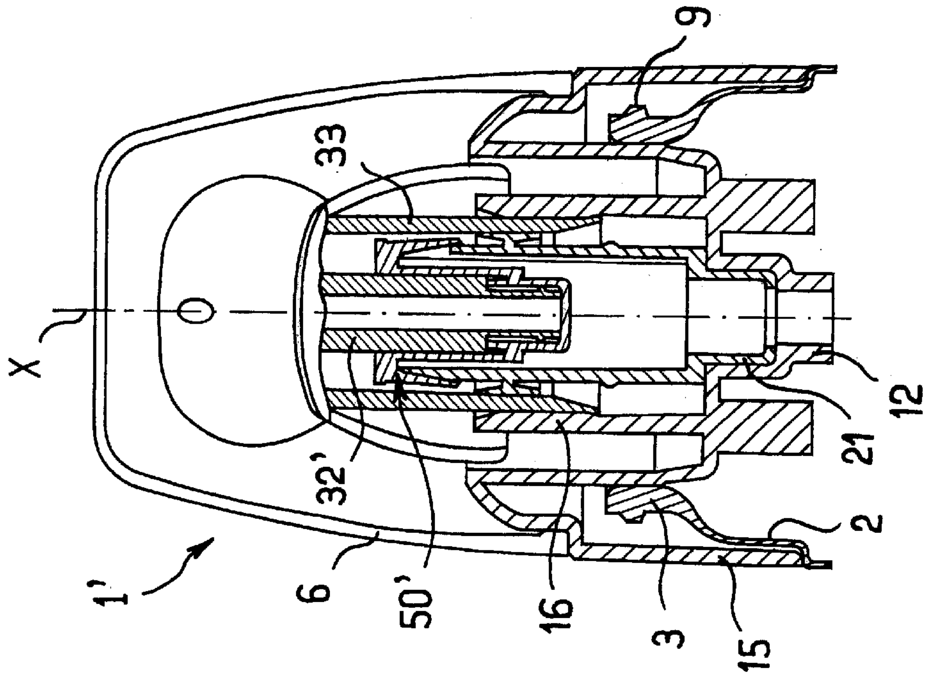
FIG. 9 is an axial section in a plane perpendicular to that of FIG. 8.
Figure 8:
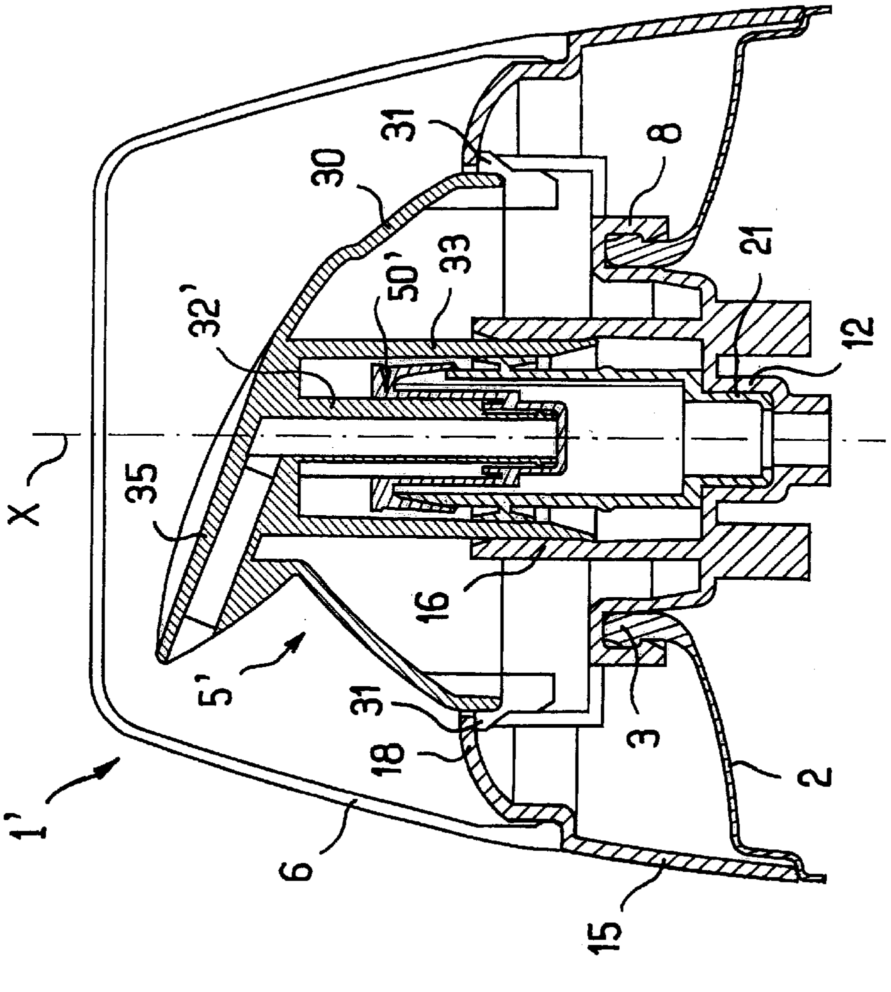
FIG. 8 is a view analogous to FIG. 1 showing a first variant embodiment of the pump.

The inner skirt 20 serves to mount a diaphragm 50 which is shown in isolation in FIG. 6, the diaphragm having a sleeve-forming central portion 51 on the axis X which is open at its top end and closed at its bottom end by an end wall 52.

The diaphragm 50 is made of a silicone or nitrile elastomer and it has a downwardly directed flexible annular lip 53 extending from its top.

Where it connects with the central portion 51, the flexible lip 53 forms a downwardly open annular channel 54 in which the top end of the inner skirt 20 is inserted until its free edge in said channel 54 bears against the web 55 connecting the flexible lip 53 to the central portion 51.

The flexible lip 53 is made so as to bear lightly against the inner skirt 20 when at rest.

The height of the flexible lip 53 is greater than that of the openings 22 and, at rest, the flexible lip 53 is suitable for bearing in leakproof manner against the outer surface of the inner skirt 20 below the openings 22, as shown in FIG. 1.

The flexible lip 53 thus acts as an intake valve, isolating the pump chamber 34 from the inside of the receptacle while the volume of the pump chamber is decreasing to dispense a quantity of substance, as described below.

The wall 55 connecting the flexible lip 53 to the central portion 51 is relatively broad and thick, thus enabling it to hold the top end of the central portion 51 of the diaphragm securely relative to the inner skirt 20 when the pushbutton 5 is pressed down.

Figure 7:
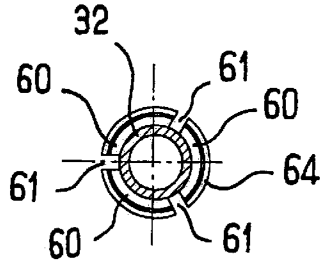
FIG. 7 is a cross-section on line VII—VII of FIG. 4.
Figure 5:
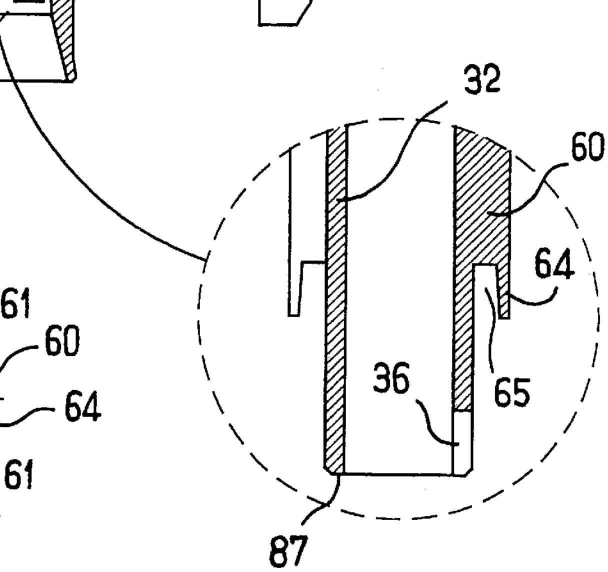
FIG. 5 shows a detail of FIG. 4.

The central duct 32 has axially-extending thicker portions 60 on its outside surface, there being three such portions in the embodiment described, and these portions leave axial slots 61 between them, as can be seen in FIG. 7.

The slots 61 extend along the major portion of the height of the central duct 32 from its top end and along the entire length of the thicker portions 60.

At their bottom ends the thicker portions form an engagement skirt 64 which co-operates with the central duct 32 to form a downwardly open annular channel 65.

In the embodiment described, the engagement skirt 64 is situated between one-fourth and one-third of the total height of the central duct 32 from its bottom end 87.

The central portion 51 of the diaphragm 50 has a top portion 56 and a bottom portion 57.

The bottom portion is connected to the top portion 56 via a transverse wall 58 extending radially inwards from the bottom end of the top portion 56.

The bottom portion 57 extends over the transverse wall 58 inside the top portion 56 so as to form an engagement skirt 59 which co-operates with the top portion 56 to form an upwardly open annular channel 70.

When the diaphragm 50 is in place on the support 4, the engagement skirt 64 of the central duct 32 is received in the channel 70 and the engagement skirt 59 of the diaphragm 50 is received in the channel 65 such that when the pushbutton 5 is pressed down, the central portion 51 of the diaphragm is pulled downwards essentially by engagement of the diaphragm on the engagement skirt 64 of the central duct 32.

The thickness of the engagement skirt 54 corresponds substantially to the width of the annular channel 70.

Axial slots 72 are formed in the inside face of the bottom portion 57 of the central portion 51 of the diaphragm, as can be seen in FIG. 6.

These slots 72 are of a depth which decreases progressively on coming towards the end wall 52 of the diaphragm, as can be seen in FIG. 3.

In the embodiment described, the slots 72 open out to the top end of the bottom portion 57 of the diaphragm.

The annular region 75 of the bottom portion 57 of the diaphragm which extends axially between the bottom ends of the slots 72 and the end wall 52 extends over a height that is greater than that of the radial openings 36 in the central duct 32.

In addition, in the embodiment described, the inside diameter of said annular region 75 is selected in such a manner that at rest it bears in leakproof manner against the central duct 32 above the radial openings 36, thereby isolating them from the slots 72.

The pump 1 operates as follows.

It is assumed that the pump 1 is primed.

When the user pushes the pushbutton 5 down, the central duct 32 moves downwards and the top portion 56 of the diaphragm is stretched elastically, being retained at its top end by the top end of the inner skirt 20 and being engaged at its bottom end on the engagement skirt 64.

The substance contained in the pump chamber 34 is compressed and the flexible lip 53 bears in leakproof manner against the outside face of the inner skirt 20.

Under the pressure of the substance, the annular region 75 of the diaphragm 50 moves away from the central duct 32 and the substance can reach the radial openings 36 so as to flow via the inside of the central duct to the outlet orifice of the dispensing endpiece 35.

Because the diaphragm 50 is engaged on the central duct 32 at a location that is remote from the end wall 52, the end wall is subjected to little mechanical stress while substance is being dispensed, and the annular region 75 which is not stretched to any great extent can move away from the central duct 32 relatively easily under the pressure of the substance which flows via the slots 61.

When the user releases the pushbutton 5, the top portion 56 of the diaphragm 50 returns under its own elasticity to its initial shape, thereby returning the pushbutton 5 upwards.

Suction is then established in the pump chamber 34 which has the effect of moving the flexible lip 53 away from the inner skirt 20 and allowing substance to reach the pump chamber 34 by flowing inside the endpiece 12 and the grooves 25 made in the inside face of the inner skirt 20.

The suction which is established in the pump chamber 34 while the pushbutton 5 is rising also has the effect of pressing the annular region 75 of the diaphragm against the central duct 32 and thus of isolating the radial openings 36 from the pump chamber 34.

In the pump of the invention, the spring function of the diaphragm is somewhat independent from its delivery valve function, because the diaphragm is engaged on the central duct at a location which is remote from the bottom end of the diaphragm.

In other words, between the two regions where the diaphragm is engaged on the support and on the central duct respectively, the diaphragm has no function other than a spring function and it does not perform a valve function.

To assemble the pump 1, the diaphragm 50 is initially put into place on the central duct 32 of the pushbutton 5 and then the pushbutton is put into place on the support 4, with the catches 31 deforming elastically to move past the top edge 18 of the outer skirt 15.

The length of the top portion 56 of the diaphragm 50 is selected in such a manner that when the pushbutton 5 comes to bear via its catches 31 against said top edge 18, the diaphragm is under tension.

FIGS. 8 to 12 show a variant embodiment.

In these figures, the same reference symbols are used for elements that are identical to those described above.

The pump 1' shown in FIGS. 8 to 12 differs from that described above by the shape of the central duct 32' of the pushbutton 5' and by the shape of the diaphragm 50'.

More precisely, the central duct 32' in this variant embodiment has a radial opening 36' of smaller height, and it has an annular bead 80 at a relatively short distance from its bottom end 87 and above the radial opening 36'.

Otherwise the central duct 32' is identical to the central duct 32 as described above.

Figure 10:
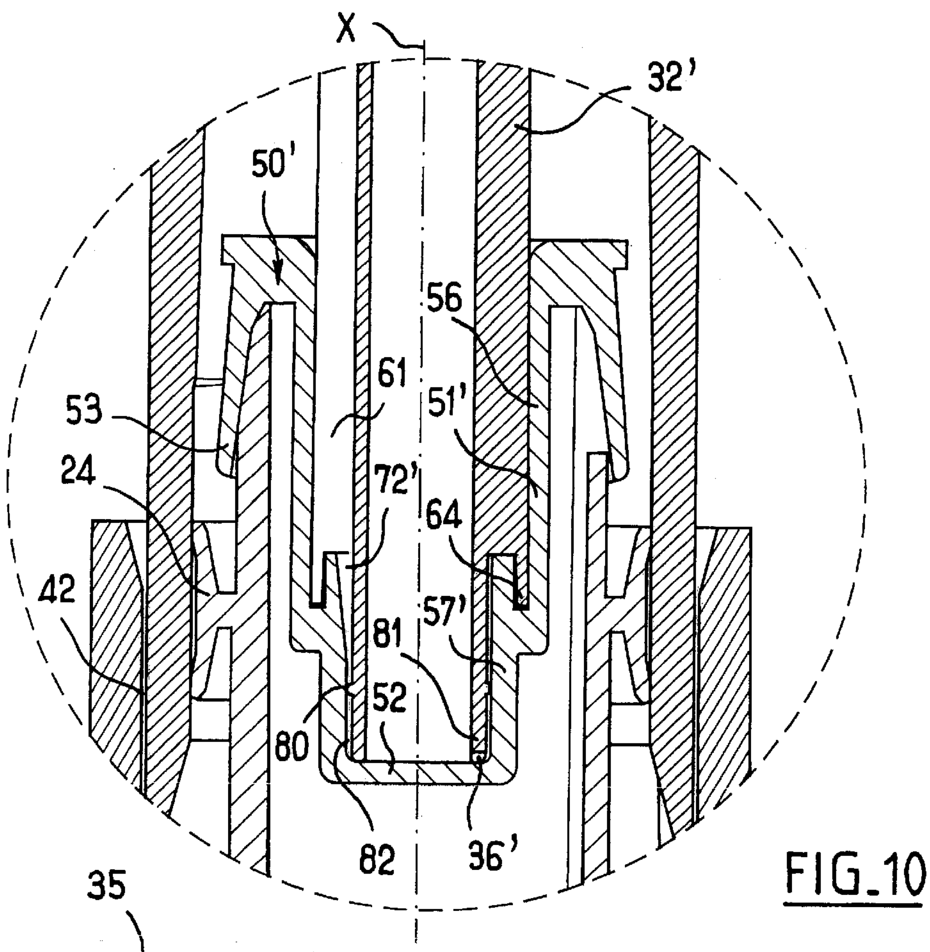
FIG. 10 shows a detail of FIG. 8.
Figure 11:
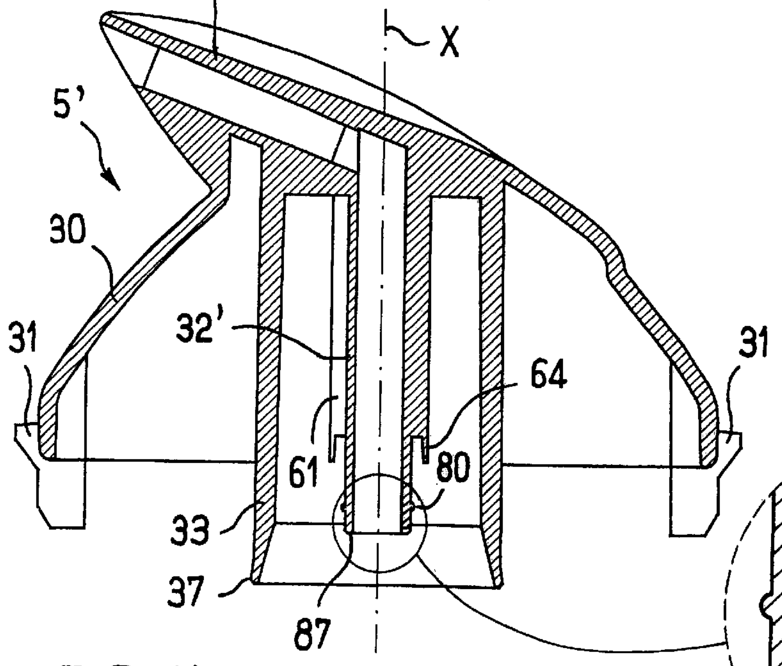
FIG. 11 shows the pushbutton of the FIG. 8 pump in isolation.
Figure 12:
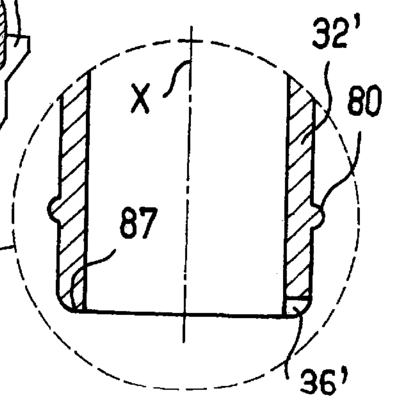
FIG. 12 shows a detail of FIG. 11.
Figure 14:
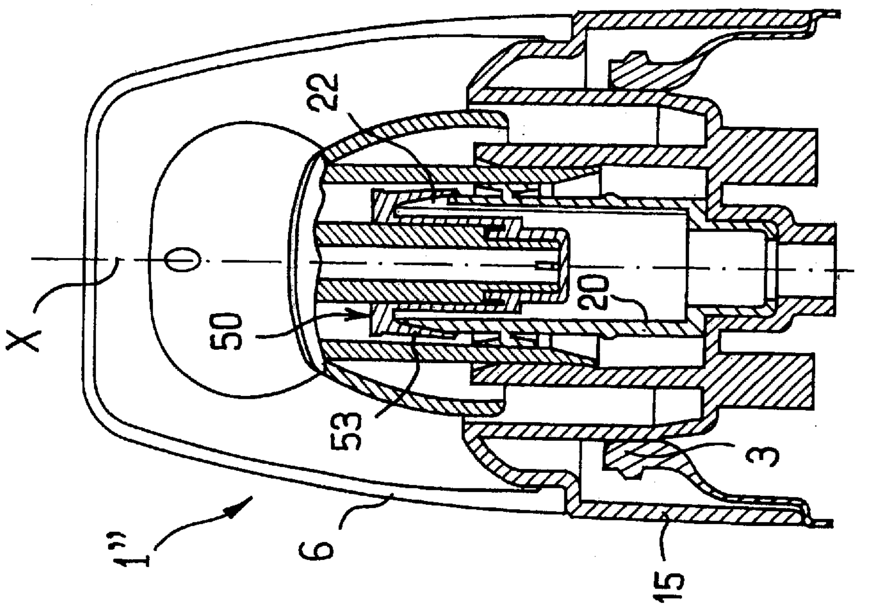
FIG. 14 is an axial section in a plane perpendicular to that of FIG. 13.
Figure 13:
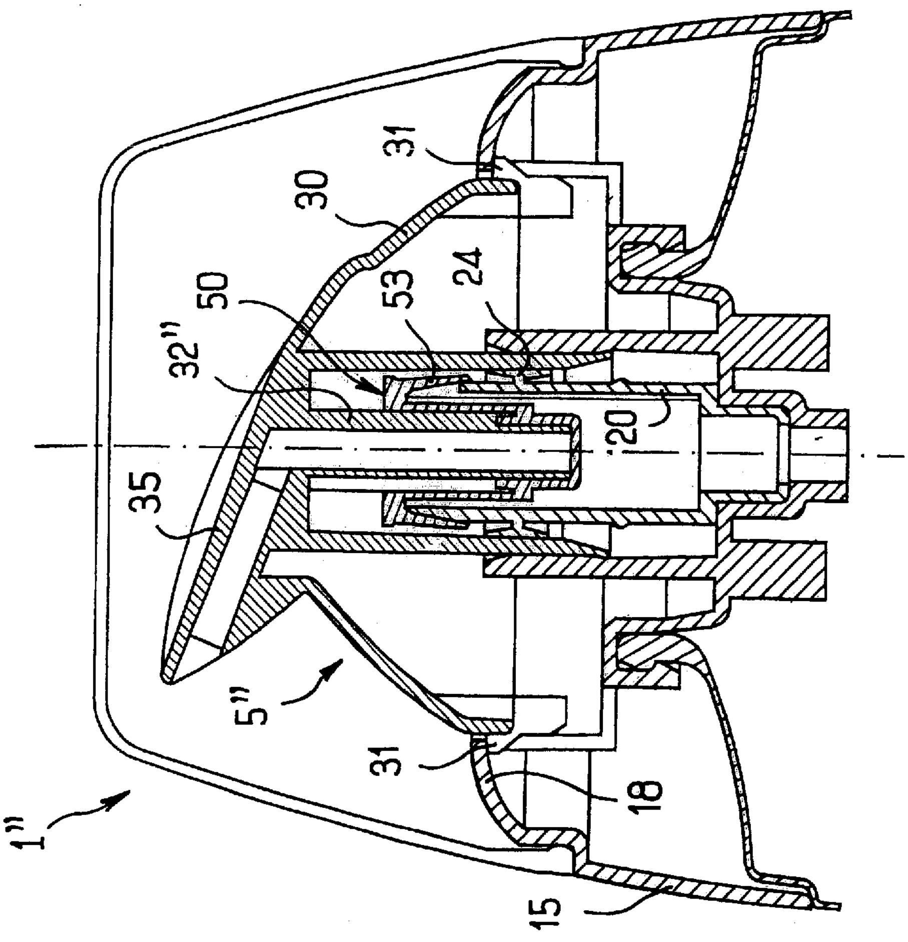
FIG. 13 is a view analogous to FIG. 1 showing a second variant embodiment of the pump.
Figure 15:
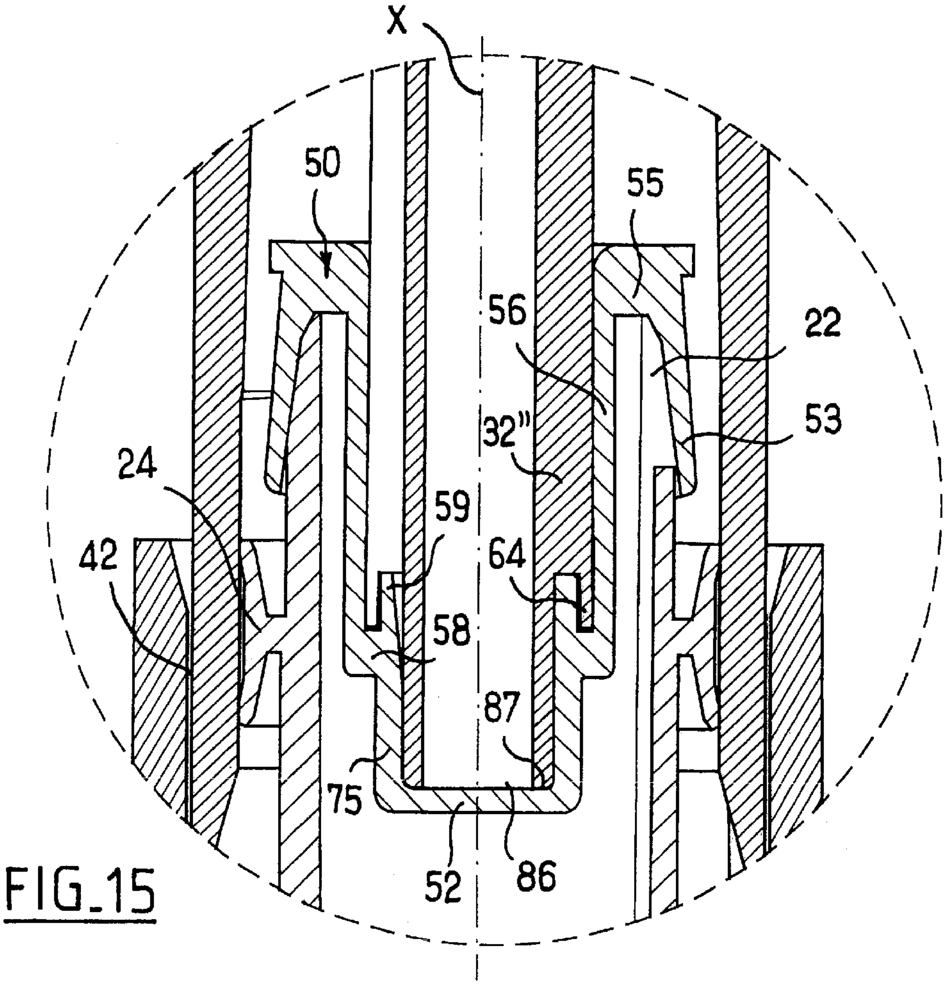
FIG. 15 shows a detail of FIG. 13.
Figure 16:
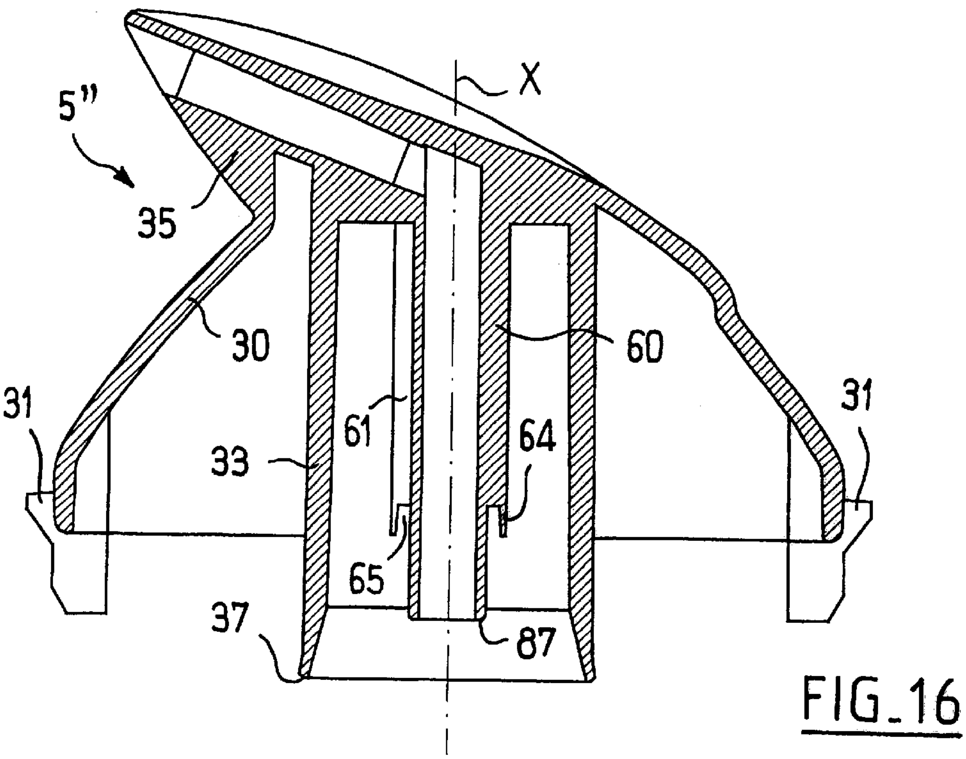
FIG. 16 shows the pushbutton of the FIG. 13 pump in isolation.

The diaphragm 50' has a central portion 51' whose bottom portion 57' has an inside diameter that is slightly greater than that of the bottom portion 81 of the central duct 32', and co-operates therewith to leave annular clearance 82, as can be seen in FIG. 10.

The inside diameter of the bottom portion 57' corresponds to the outside diameter of the annular bead 80 so that the bottom portion 57' at rest presses against said annular bead 80 in leakproof manner.

Axial slots 72' are formed in the inside face of the bottom portion 57'.

These slots 72' open out at their bottom ends in the annular clearance 82 above the bead 80.

The diaphragm 50' is otherwise identical to the diaphragm 50 as described above.

In the embodiment of FIGS. 8 to 12, flow of the substance while the pushbutton 5' is being pushed down is made easier by the presence of the annular clearance 82.

FIGS. 13 to 16 show a pump 1" constituting a second variant embodiment of the invention.

This pump 1" differs from the pump shown in FIG. 1 by the fact that the central duct 32" of the pushbutton 5" does not have radial openings 36, but merely the axial opening 86 defined by the circular edge at the bottom end 87 of the central duct 32".

In spite of that, the pump 1" can operate properly because the end wall 52 of the diaphragm 50 which is of substantially the same thickness as the annular region 75 is capable of deforming downwards under drive from the pressure of the substance when the pushbutton 5" is pushed down, since the end wall 52 is not under tension due to the fact that the diaphragm 50 is engaged to the engagement skirt 64 at a point that is higher up.

Naturally, the invention it not limited to the embodiments described above.

In particular, it is possible to modify the shape of the diaphragm, that of the engagement means for engaging the diaphragm on the central duct, and indeed the shape of the support and of the pushbutton without thereby going beyond the ambit of the present invention.

What is claimed is:

1. A pump for dispensing a substance comprising:

a support, a moving member mounted to move relative to said support, a diaphragm, said moving member having a duct in which the substance to be dispensed penetrates via at least one opening, said support co-operating with the moving member to define a variable-volume pump chamber around said duct, said diaphragm being held by retaining means on the support and in which one end of said duct is inserted, said diaphragm having a valve-forming portion arranged to isolate the pump chamber from said opening(s) of the duct while the volume of the pump chamber is increasing and the substance is being sucked into the pump chamber, said diaphragm also bearing against the moving member in such a manner that movement of the moving member to dispense the substance causes the diaphragm to be stretched elastically, said pump having means suitable, during movement of the moving member for dispensing the substance, for minimizing the stretching of the valve-forming portion of said diaphragm.

2. A pump according to claim 1, wherein the diaphragm has first engagement means arranged to cooperate with second engagement means secured to said duct, said second engagement means being spaced apart from the end of the duct.

3. A pump according to claim 2, wherein said diaphragm has a central portion in which the one end of said duct is inserted and the first engagement means of the diaphragm form a channel that is open in the direction facing away from an end wall of said central portion, and wherein the second engagement means comprise an engagement skirt directed towards the end of the duct.

4. A pump according to claim 3, wherein the channel is formed between two concentric tubular walls respectively constituting a bottom portion and a top portion of the central portion of the diaphragm, that overlap in part, and that are united by a transverse wall constituting a web of said channel.

5. A pump according to claim 4, wherein a radially inner surface of the tubular wall forming the bottom portion of the central portion of the diaphragm has at least one axial slot therein.

6. A pump according to claim 5, wherein said at least one axial slot extends downwards from a top end of the tubular wall forming the bottom portion of the central portion of the diaphragm to perceptibly beneath the transverse wall.

7. A pump according to claim 2, wherein the diaphragm is arranged to isolate the pump chamber from the opening(s) of the duct by causing an annular region to bear in leakproof manner against a zone of the duct situated beneath said second engagement means.

8. A pump according to claim 7, wherein the zone of the duct against which the diaphragm bears while the volume of the pump chamber is increasing and the substance is being sucked into the pump chamber is defined by an annular bead.

9. A pump according to claim 8, wherein the diaphragm co-operates with the duct to provide annular clearance on either side of said bead.

10. A pump according to claim 1, wherein the duct has a bottom portion comprising at least one radial opening.

11. A pump according to claim 1, wherein the duct has a bottom portion deprived of any radial opening.

12. A pump according to claim 2, wherein the second engagement means of the duct are constituted by ends of thicker portions of the duct, said thicker portions leaving slots between one another enabling the substance to pass towards the opening(s) of the duct.

13. A pump according to claim 1, wherein the diaphragm has a flexible lip suitable firstly for isolating the pump chamber from a source of the substance while the volume of the pump chamber is decreasing, and secondly for enabling the substance to penetrate into the pump chamber while the volume thereof is increasing.

14. A pump according to claim 13, wherein the flexible lip is connected to the central portion of the diaphragm so as to form a downwardly open annular channel, and wherein the retaining means are constituted by an end of an inner skirt coming to bear against a web of said channel so as to retain the diaphragm when the moving member is moved downwards in order decrease the volume of the pump chamber.

15. A pump according to claim 14, wherein a top end of the inner skirt has openings, a height of the openings being less than a height of the flexible lip, said openings enabling the substance to reach the pump chamber while its volume is increasing, and while the flexible lip is spaced apart from the inner skirt under an effect of thrust from the substance flowing towards the pump chamber.

16. A pump according to claim 13, wherein the flexible lip is of thickness that increases going towards a top end of the diaphragm.

17. A pump according to claim 13, wherein a top end of the central portion of the diaphragm is connected to an annular portion of width and thickness selected in such a manner as to improve retention of the diaphragm while the central portion is being stretched.

18. A pump according to claim 1, the moving member having a tubular skirt defining a radially outer wall of the pump chamber, wherein the support includes sealing means bearing in leakproof manner against said tubular skirt, said tubular skirt being downwardly open and extending concentrically around the duct.

19. A pump according to claim 1, wherein the moving member constitutes a pushbutton, the duct being integrally formed with a dispensing endpiece.

20. A pump according to claim 1, wherein the diaphragm is made of a nitrile elastomer.

21. A receptacle fitted with a pump as defined in claim 1.

22. A pump according to claim 1, wherein said duct extends in a central region of said moving member.

23. A pump according to claim 5, wherein the radially inner surface of the tubular wall forming the bottom portion of the central portion of the diaphragm has a plurality of axial slots therein.

24. A pump according to claim 1, wherein the diaphragm is made of a silicone elastomer.

25. A pump for dispensing a substance, comprising:

a support, a moving member mounted to move relative to said support, said moving member having a duct in which the substance to be dispensed penetrates via at least one opening, said support co-operating with the moving member to define a variable-volume pump chamber around said duct, and a diaphragm in which one end of said duct is inserted, said diaphragm having:

a valve-forming portion arranged to isolate the pump chamber from said opening(s) of the duct while the volume of the pump chamber is increasing and the substance is being sucked into the pump chamber, a stretchable portion configured so that movement of the moving member to dispense the substance causes said stretchable portion to be stretched elastically, and a portion connected in a fixed manner to said duct and intermediate between said valve-forming portion and said stretchable portion.

26. A pump according to claim 25, wherein the diaphragm has first engagement means arranged to cooperate with second engagement means secured to said duct, said second engagement means being spaced apart from the end of the duct.

27. A pump according to claim 26, wherein the first engagement means of the diaphragm form a channel that is open in a direction facing away from an end wall of said intermediate portion and, wherein the second engagement means comprise an engagement skirt directed towards the end of the duct.

28. A pump according to claim 27, wherein the channel is formed between two concentric tubular walls of the diaphragm.

29. A pump according to claim 28, wherein a radially inner surface of one of said tubular walls has at least one axial slot therein.

30. A pump according to claim 29, wherein said at least one axial slot extends downwards from a top end of the tubular wall forming the bottom portion of the intermediate portion of the diaphragm to perceptibly beneath a transverse wall uniting the two tubular walls.

31. A pump according to claim 25, wherein the duct has a bottom portion comprising at least one radial opening.

32. A pump according to claim 25, wherein the duct has a bottom portion deprived of any radial opening.

33. A pump according to claim 26, wherein the second engagement means of the duct are constituted by ends of thicker portions of the duct, said thicker portions leaving slots between one another enabling the substance to pass towards the opening(s) of the duct.

34. A pump according to claim 25, wherein the diaphragm has a flexible lip suitable firstly for isolating the pump chamber from a source of the substance while the volume of the pump chamber is decreasing, and secondly for enabling the substance to penetrate into the pump chamber while the volume thereof is increasing.

35. A pump according to claim 34, said diaphragm being held by retaining means on the support, wherein the flexible lip is connected to the intermediate portion of the diaphragm so as to form a downwardly open annular channel, and wherein the retaining means are constituted by an end of an inner skirt coming to bear against a web of said channel so as to retain the diaphragm when the moving member is moved downwards in order to decrease the volume of the pump chamber.

36. A pump according to claim 35, wherein a top end of the inner skirt has openings, a height of the openings being less than a height of the flexible lip, said openings enabling the substance to reach the pump chamber while its volume is increasing, and while the flexible lip is spaced apart from the inner skirt under an effect of thrust from the substance flowing towards the pump chamber.

37. A pump according to claim 34, wherein the flexible lip is of thickness that increases going towards a top end of the diaphragm.

38. A pump according to claim 34, wherein a top end of the intermediate portion of the diaphragm is connected to an annular portion of width and thickness selected in such a manner as to improve retention of the diaphragm while said intermediate portion is being stretched.

39. A pump according to claim 25, the moving member having a tubular skirt defining a radially outer wall of the pump chamber, wherein the support includes sealing means bearing in leakproof manner against said tubular skirt, said tubular skirt being downwardly open and extending concentrically around the duct.

40. A pump according to claim 25, wherein, when the pump is at rest, the stretchable portion is under tension.

41. A pump according to claim 25, wherein the moving member constitutes a pushbutton, the duct being integrally formed with a dispensing endpiece.

42. A pump according to claim 25, wherein the diaphragm is made of a nitrile elastomer.

43. A pump according to claim 25, wherein said duct extends in a central region of said moving member.

44. A pump according to claim 25, wherein the diaphragm is made of a silicone elastomer.

45. A receptacle fitted with a pump as defined in claim 25.

46. A pump according to claim 1, wherein the means for minimizing the stretching of the valve-forming portion of said diaphragm comprises connecting means for connecting said duct and said diaphragm.

47. A pump according to claim 46, wherein a portion of the diaphragm extending between said retaining means and said connecting means performs a spring function only.

48. A pump according to claim 47, wherein the valve-forming portion of the diaphragm that is arranged to isolate the pump chamber from the opening(s) of the duct lies outside the portion of the diaphragm that extends between said retaining means and said connecting means.

49. A pump according to claim 46, wherein, when the pump is at rest, the portion of the diaphragm that extends axially between the retaining means and the connecting means is under tension.

* * * * *